United States Patent
Anderson et al.

(10) Patent No.: US 8,112,739 B2
(45) Date of Patent: Feb. 7, 2012

(54) DATA DRIVEN TRANSFER FUNCTIONS

(75) Inventors: Doug Anderson, Edmonds, WA (US);
Andrew Best, Seattle, WA (US);
Kenneth Y. Ogami, Bothell, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1551 days.

(21) Appl. No.: 11/518,482

(22) Filed: Sep. 7, 2006

(65) Prior Publication Data

US 2007/0130531 A1 Jun. 7, 2007

Related U.S. Application Data

(60) Provisional application No. 60/741,618, filed on Dec. 1, 2005, provisional application No. 60/741,643, filed on Dec. 1, 2005.

(51) Int. Cl.
*G06F 9/45* (2006.01)
(52) U.S. Cl. ....................................... 717/106
(58) Field of Classification Search .................... 717/106
See application file for complete search history.

(56) References Cited

U.S. PATENT DOCUMENTS

| | | | |
|---|---|---|---|
| 7,761,856 B2 * | 7/2010 | Griffin | 717/137 |
| 2001/0034743 A1 * | 10/2001 | Thomas | 707/501.1 |
| 2005/0120340 A1 * | 6/2005 | Skazinski et al. | 717/140 |
| 2005/0193370 A1 * | 9/2005 | Goring et al. | 717/115 |
| 2006/0015844 A1 * | 1/2006 | Johnson et al. | 717/106 |
| 2006/0225053 A1 * | 10/2006 | Lakshman et al. | 717/140 |
| 2007/0028223 A1 * | 2/2007 | Meijer et al. | 717/140 |

OTHER PUBLICATIONS

Cypress, Application Note, "PSoC Express™ Primer: First Introduction," AN2261, Revision A, Mar. 15, 2005, pp. 1-19.
Cypress Microsystems, Application Note, "Global Resources in PSoC™ Designer," AN2221, Revision A, Oct. 15, 2004, pp. 1-6.
Cypress Perform, PSoC Designer™, IDE User Guide, Document # 38-12002 Rev. E, 2002-2005, pp. 2-160.

* cited by examiner

*Primary Examiner* — John Chavis

(57) ABSTRACT

In one embodiment, a method for adding a new function type to an application development tool includes determining that a function specified by a user for a design of an application is of a new type, and presenting a user interface (UI) associated with the specified function. The method further includes creating custom metadata based on input provided by the user via the UI for the specified function, and converting the custom metadata into expression metadata having a format understandable by a code generator.

20 Claims, 10 Drawing Sheets

DATA DRIVEN TRANSFER FUNCTIONS

CROSS-REFERENCE TO RELATED APPLICATIONS

This application claims the benefit of U.S. Provisional Application Nos. 60/741,618 and 60/741,643, both filed Dec. 1, 2005, and incorporated herein by reference in their entirety.

BACKGROUND

1. Field

Embodiments of the invention relate generally to application development and more specifically, but not exclusively, to facilitating the creation of new types of functions defining the behavior of an application.

2. Background Information

Embedded system development tools assist users in the creation of applications to be programmed into processing devices such as microcontrollers. One existing embedded system development tool allows a system designer to create an embedded application by combining system input and output (I/O) devices such as LEDs, switches, sensors and fans. The embedded system development tool provides a graphical user interface (GUI) that uses I/O device drivers to represent I/O devices to a user. The GUI also presents to a user various functions that define the behavior of an application. The user can select one of these functions and customize it for the specified I/O devices.

The functions presented to the user are of predefined types. Each function type has a distinct logic that is hard coded in the embedded system design tool. If a new function type needs to be added, the embedded system development tool has to be modified to incorporate the new function type. The modified embedded system development tool is then recompiled and shipped to the customers.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

Embodiments of the present invention utilize application composition mechanisms to dynamically construct customized applications for programming processing devices such as microcontrollers. These application composition mechanisms allow mixing and matching of hardware resources as long as the processing device can support the needed resources, thus providing maximum utilization of the hardware resources for a given project of an application.

Figure 1:
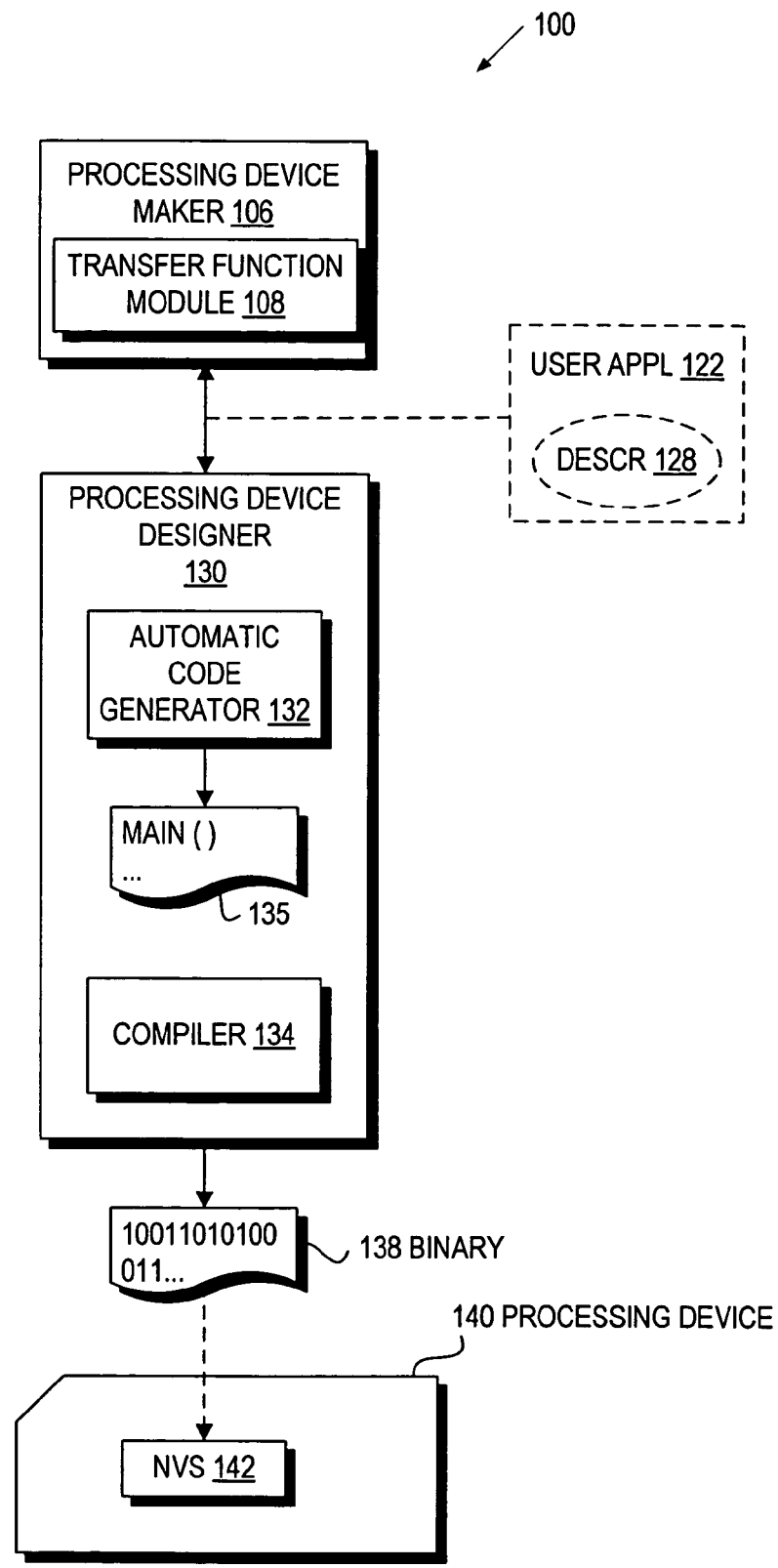
FIG. 1 is a block diagram of one embodiment of an embedded application development tool.

FIG. 1 is a block diagram of one embodiment of an embedded application development tool 100. The tool 100 provides automated code generation of processing device firmware in accordance with one embodiment of the present invention.

The tool 100 includes a processing device maker 106 that is responsible for constructing a user application 127 for implementation on a processing device 140. The user application 127 may be described in a user application description 128. In one embodiment, the user application description 128 is a text file that describes the user's application 127.

In one embodiment, the processing device maker 106 provides a design composition user interface (UI) that allows a user to select input and output (I/O) devices for the design of the application 127.

In one embodiment, the processing device maker 106 includes a transfer function module 108 that facilitates the construction of functions that specify user-controlled logic for defining the behavior of the application 122. These functions may include transfer functions that define relationships between input and output devices selected for the application 122. One embodiment of the transfer function module 108 will be discussed in more detail below in conjunction with FIG. 3.

After the user completes the design of the application 127, the user may perform a simulation of the user application 127. The simulation capability enables hardware independence by verifying the application behavior without requiring the user to compile and debug the firmware on the targeted processing device. Simulation also includes the ability to create complex input files to exhaustively test the application behavior with arbitrarily large combinations of input values. The simulation logs the outputs based on the application behavior so that the results may be analyzed by the user.

Next, the user may request that processing device code be automatically generated. The user does not have to perform any actual coding. In one embodiment, after the user selects the targeted processing device 140, the user application description 128 is handed-off to a processing device designer 130 for the generation of processing device code. The processing device designer 130 may include an automatic code generator 132 that assembles the code for the user's application 127 based on the user application description 128. The automatic code generator 132 generates processing device code 135 (e.g., high-level language code, such as C, low-level code, such as Assembly, or a combination thereof).

A compiler 134 compiles the code 135 to generate a binary 138, also known as a binary image or a Read-Only Memory (ROM) image. The binary 138 is loaded into a Non-Volatile Storage (NVS) 142 of the processing device 140. In one embodiment, NVS 142 includes flash memory.

Embodiments of the processing device 140 may include one or more general-purpose processing devices, such as a microprocessor or central processing unit, a network processor, a microcontroller, an embedded Programmable Logic Device (PLD), or the like. Alternatively, the processing device may include one or more special-purpose processing devices, such as a Digital Signal Processor (DSP), an Application Specific Integrated Circuit (ASIC), a Field Programmable Gate Array (FPGA), or the like. The processing device may also include any combination of a general-purpose processing device and a special-purpose processing device.

It will be appreciated that the code 135 is constructed from pre-built and pre-tested code libraries, thus eliminating time wasted on debugging, such as finding syntax errors. It will also be appreciated that the user has generated the user application 127 without referencing a targeted processing device. Instead of choosing a processing device to implement a user application and then writing code for that processing device, embodiments of the present invention allow a user application to be created and then code automatically generated for a particular processing device. Moreover, a user may take a user application, make revisions to the user application, and quickly generate revised programming device code.

As discussed above, the processing device maker 106 allows the user to select I/O devices for the user application 127. In one embodiment, the processing device maker 106 uses device drivers that represent I/O and interface devices to the user. Generally, a device driver is a building block used in the construction of the user application 127. In one embodiment, a device driver maps onto a channel that provides an adaptation layer between the device driver and processing device peripherals. A channel represents resource needs of a hardware function associated with a corresponding device driver. The processing device maker 106 evaluates a combination of channels pertaining to the user application 127 and finds applicable processing devices that are capable of accommodating the channels' resource needs. Subsequently, when the user requests to generate processing device code for the user application 127, the processing device maker 106 allows the user to select a desired processing device (targeted processing device 140) from the applicable processing devices described above.

In one embodiment, the processing device maker 106 finds applicable processing devices using predefined application projects (also referred to herein as base projects). A base project describes hardware components (e.g., blocks, pins, etc.) of a specific processing device.

Figure 2:
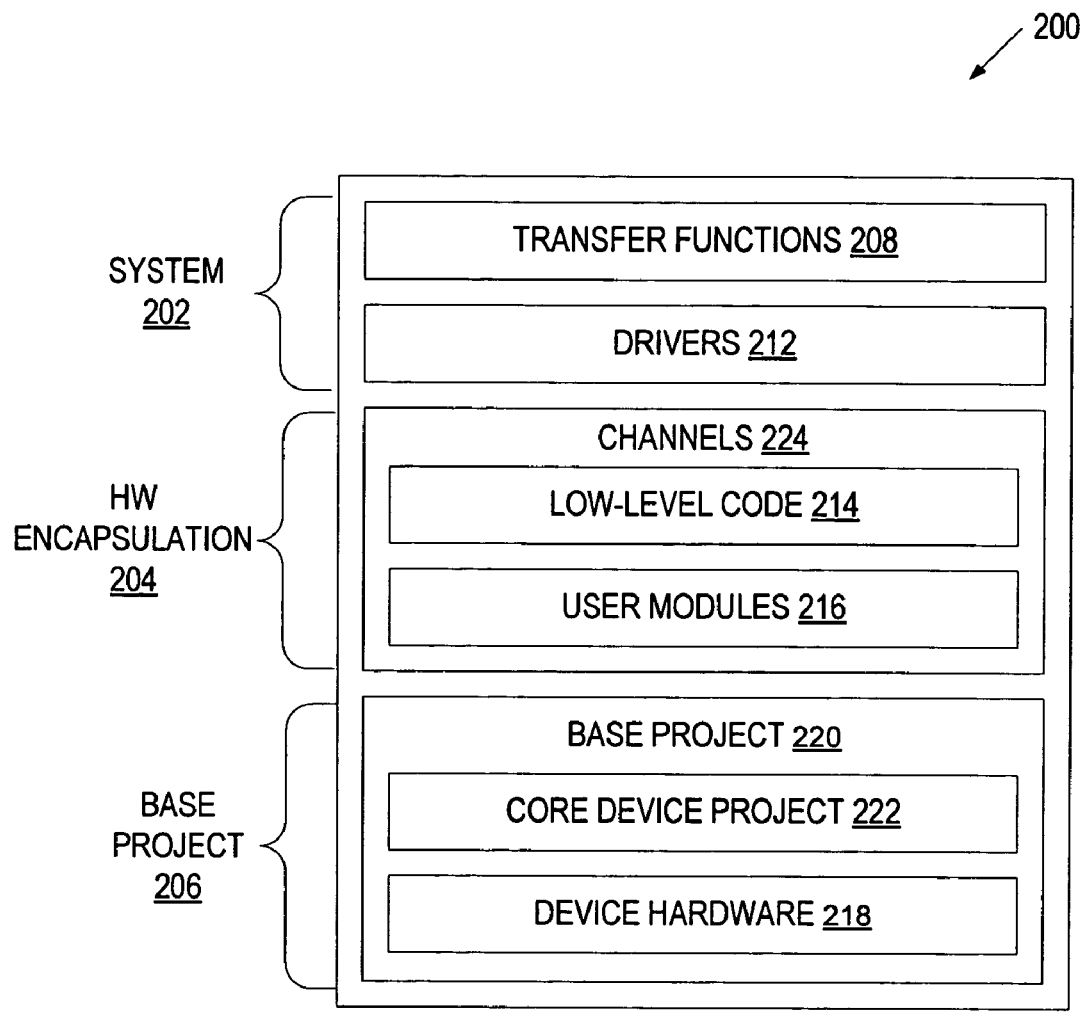
FIG. 2 illustrates a firmware stack model in accordance with one embodiment of the invention.

FIG. 2 illustrates a firmware stack model 200 in accordance with one embodiment of the invention is shown. Firmware stack 200 shows a logical structure of at least a portion of the processing device code 135. A portion of the stack 200 is abstracted away from specific hardware. Such hardware independency provides the automatic code generator 132 with a consistent architecture for stitching together various code blocks.

Firmware stack 200 includes a system layer 202, a hardware encapsulation layer 204, and a base project layer 206. The functionality of the system layer 202 is independent of the targeted processing device. Also, interfaces, such as Application Program Interfaces (APIs), made between system layer 202 and the remaining layers of firmware stack 200 are standardized regardless of the targeted processing device. The term "standardized" refers to the hardware independence of the APIs. This abstraction away from specific hardware allows system layer 202 to function without regard to the particular hardware. The low layers of firmware stack 200 have "knowledge" of the specific hardware and take care of the implementation details for the system layer 202.

The hardware encapsulation layer 204 and the base project layer 206 are generated based at least in part on the targeted processing device. Hardware encapsulation layer 204 represents the underlying hardware to system layer 202. Base project layer 206 includes a set of standard functions associated with the targeted processing device hardware. Base project layer 206 may include functionality at the register level of the targeted processing device.

System layer 202 may include transfer functions 708 and drivers 712. System layer 702 is targeted by an application level mapping function. Transfer functions 208 invoke the transfer functions defined by the user. The transfer functions are the highest level of the code. They have no knowledge about any hardware. They only know about variables set by a driver or used to set the output of a driver.

Drivers 212 represent I/O and interface devices to the user. In one embodiment, drives 212 may include three types: input, output, or interface. An output driver may be used with a device that is controlled by the user application, such as a fan or heater. Input drivers may be used for sensors, such as temperature or voltage sensors. Interface drivers may be used for devices that allow access to system variables and status, such as an Inter-Integrated Circuit (I2C) or a Serial Peripheral Interface (SPI).

Transfer functions 208 and drivers 212 may communicate with each other using APIs. Examples of APIs may include DriverName-Instantiate to initialize a device, DriverName_GetValue to return a value from an input device, and DriverName_SetValue to set an output of an output device to a specific value. These APIs are defined such that they may be invoked regardless of the particular hardware.

Drivers 212 communicate with hardware encapsulation layer 204 that include channels 224. Drivers include driver metadata and source code templates. In one embodiment, drivers 212 contain source code that converts channel information to a higher-level meaning. For example, the LM20 driver converts low-level voltage measured by the mVolts channel and converts it to its respective temperature value.

Channels 224 are hardware independent and are usually defined to provide a generic resource. These generic resources may be, for example, voltage measurements, PWM (pulse-width modulation) outputs, general purpose I/O, etc. A channel may be further defined by a channel type, such as an input voltage channel, an output voltage channel, or the like. Channels 224 provide a platform for drivers 212 and dictate the interface between the base project layer 206 and drivers 212.

Channels 224 may include channel metadata and source code templates. The channel metadata is used to map drivers 212 onto the base project 220. The source code templates are used to generate the embedded application project. Channels 224 may also include low level code 214 and user modules 216. Low level code 214 provides the implementation of channels 224. User modules 216 perform hardware functions (e.g., analog to digital conversion) required by drivers. User modules 216 may be used with block arrays in processing device hardware 218 to form hardware components, such as an Analog-Digital Converter (ADC).

The base project layer 206 includes a base project 220 associated with a specific processing device such as the targeted processing device 140. The base project 220 includes a core device project 222 that describes unique configuration characteristics of the processing device (e.g., pin configuration that can be applied to the processing device), and processing device hardware 218.

Figure 3:
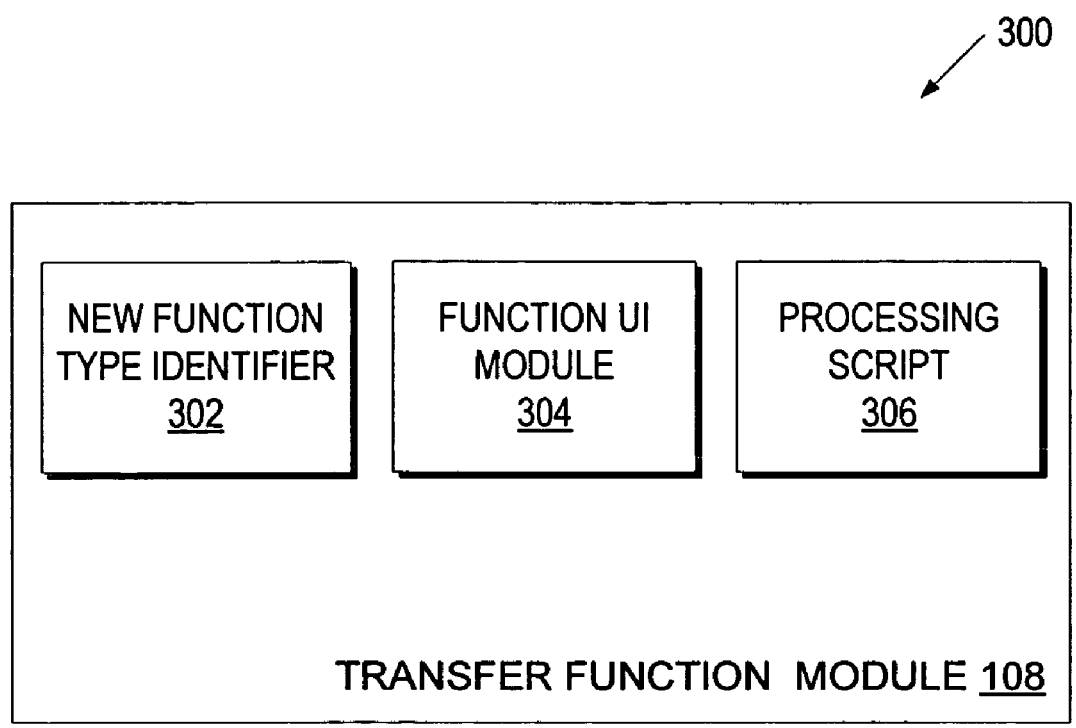
FIG. 3 is a block diagram of one embodiment of a transfer function module.

FIG. 3 is a block diagram of one embodiment of a transfer function module 108. The transfer function module may include a new function type identifier 302, a function user interface (UI) module 304, and a processing script 306.

The new function type identifier 302 is responsible for determining that a function specified by a user for the design of an application is of a new type. The new type indicates that such a function was not supported by the application development tool 100 when it was compiled the last time. In addition, in one embodiment, the new type indicates that files containing data describing the new function type were added to a directory structure associated with the application development tool 100 after its last compilation. In one embodiment, these files were created by a developer of the application development tool 100 that adds capability to the application. Such developer is referred to herein as a content author.

In one embodiment, the new function type identifier 302 determines that the specified function is of a new type by searching a list of existing (referred to herein as intrinsic) functions and determining that the name of the new function type is not on the list. Once the new function type identifier 302 determines that the specified function is of a new type, it locates files containing data describing the new function type in the directory structure associated with the application development tool 100. These files may include, for example, a metadata file containing function metadata that defines characteristics pertaining to the new function type, one or more UI files defining a UI for the new function type, and a fragment file providing substitutions into a design project for the application.

The function UI module 304 is responsible for presenting the UI associated with the specified function, and creating custom metadata based on input provided by the user via this UI. The function UI module 304 may generate the UI using the UI files discussed above. In addition, the function UI module 304 may create the custom metadata using the metadata file discussed above The processing script 306 is responsible for converting the custom metadata into expression metadata having a format understandable by a code generator 132. The processing script 306 may be a JavaScript or any other script capable of performing the conversion. In one embodiment, the processing script 306 performs the conversion by creating variables required by the function, and creating expressions specific to the function. These expressions may be programming language independent conditional and assignment expressions that can be applied to any variable in the system.

The resulting expression metadata is then used by the code generator 132 to generate code used in the embedded application.

The transfer function module 108 may also be used for new transfer function types. Transfer function types processed as discussed above are referred to herein as data driven transfer functions because they are developed and deployed based on data provided by the user, rather than programming code. Data driven transfer functions allow the development and deployment of new transfer functions from third parties without recompiling and re-releasing the application development tool 100. In addition, they provide a language neutral method of transfer function code generation and allow content authors to define custom transfer functions with custom GUIs that can be added to the tool 100 without its recompilation and are automatically discoverable at runtime.

Figure 4:
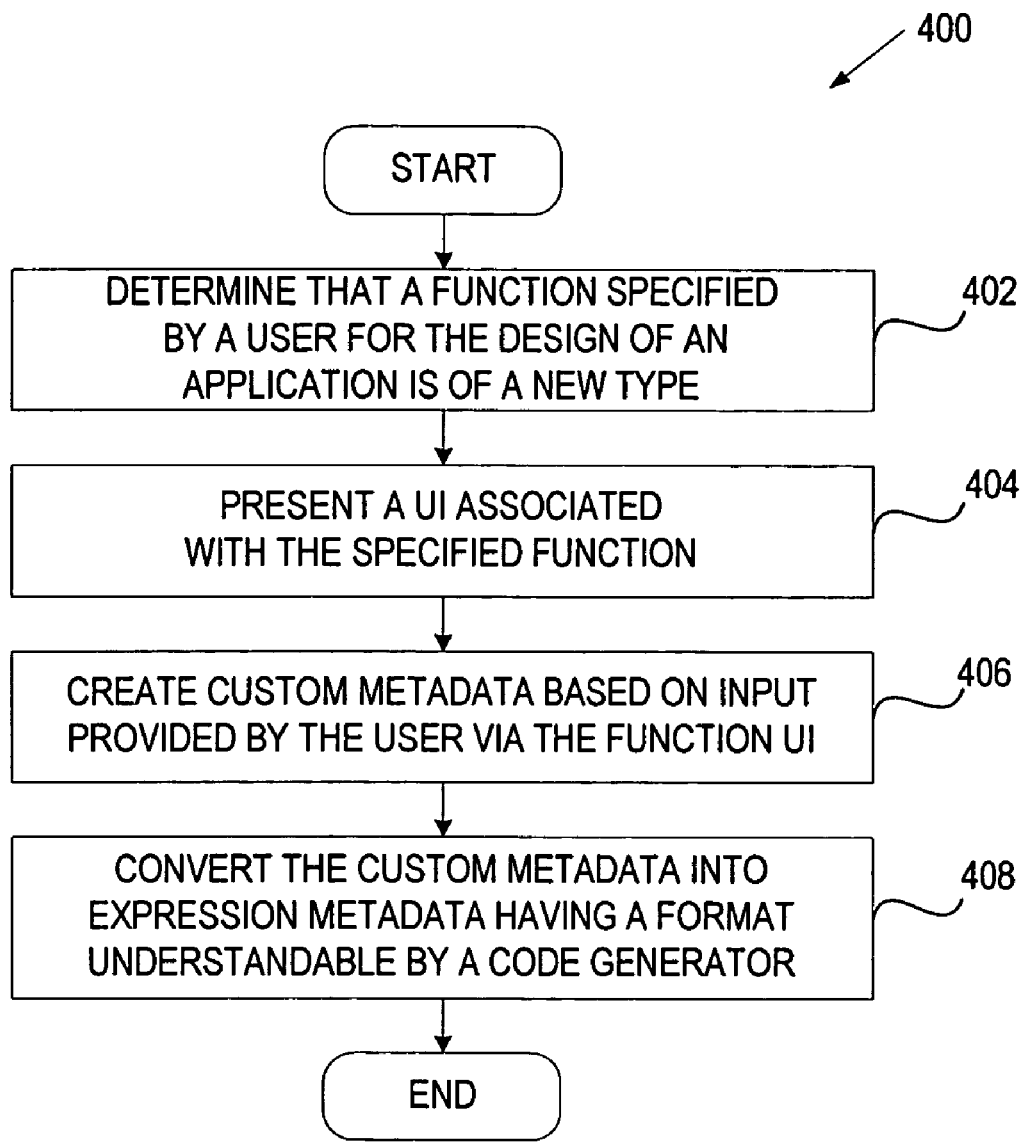
FIG. 4 is a flow diagram of one embodiment of a method for constructing a transfer function of a new type.

FIG. 4 is a flow diagram of one embodiment of a method 400 for constructing a transfer function. The method 400 may be performed by processing logic of the transfer function 108. Processing logic may comprise hardware (e.g., circuitry, dedicated logic, programmable logic, microcode, etc.), software (such as run on a general purpose computer system or a dedicated machine), or a combination of both.

Referring to FIG. 4, method 400 begins with determining that a function specified by a user for the design of an application is of a new type (block 402). Processing logic may determine that the specified function is of a new type by searching a list of existing (referred to herein as intrinsic) functions and determining that the name of the new function type is not on the list. An exemplary list of intrinsic transfer functions may be as follows:

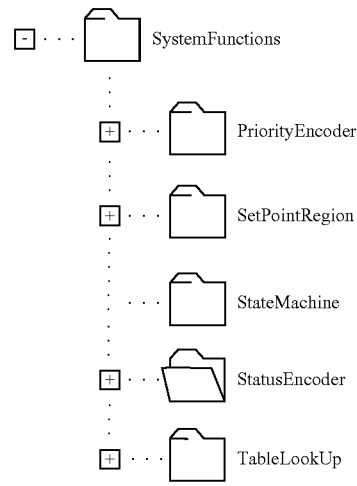

At block 404, processing logic presents a UI associated with the specified function. Processing logic may generate the function user interface using custom UI files provided by the content author.

At block 406, processing logic creates custom metadata based on input provided by the user via the function UI. Processing logic may create the custom metadata using a custom metadata file provided by the content author.

At block 408, processing logic converts the custom metadata into expression metadata having a format understandable by a code generator. In one embodiment, processing logic is represented by a script that performs the conversion by creating variables required by the function, and creating expressions specific to the function. These expressions may be programming language independent conditional and assignment expressions that can be applied to any variable in the system.

Figure 5:
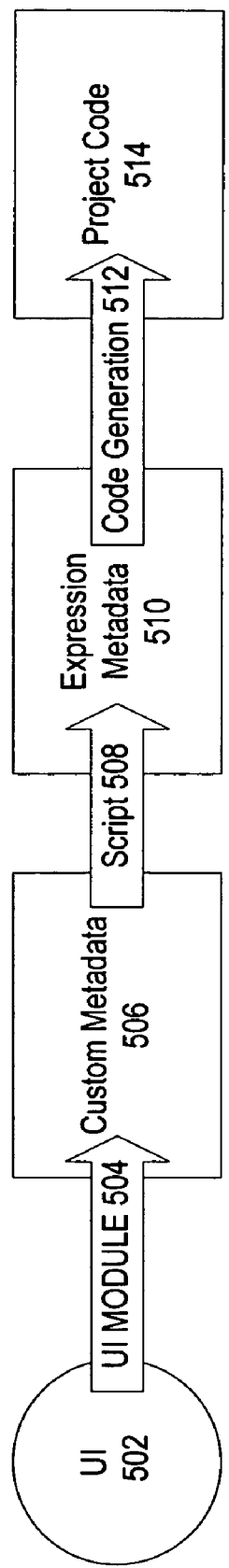
FIG. 5 illustrates the execution flow of a process for implementing a transfer function of a new type.

FIG. 5 illustrates the execution flow of a process for deploying a transfer function of a new type according to one embodiment of the present invention. The flow starts with presenting a function UI 502 to the user. Once the user enters data for the function via the UI 502, UI module 504 creates custom metadata 506 based on the entered data. Further, script 508 converts the custom metadata 506 into expression metadata 510, which is then used by code generator 512 to generate the project code.

Figure 6:
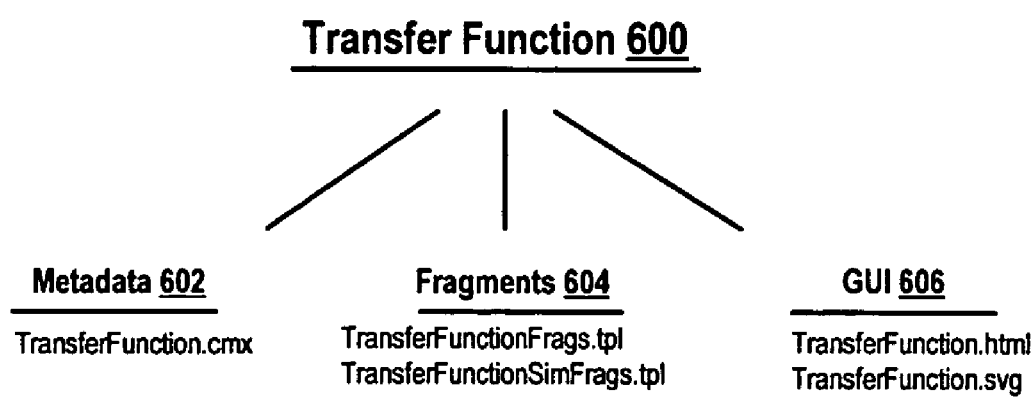
FIG. 6 illustrates an exemplary structure of a data driven transfer function in accordance with one embodiment of the present invention.

FIG. 6 illustrates an exemplary structure of a data driven transfer function 600, according to one embodiment of the present invention. The transfer function 600 includes transfer function metadata 602, fragment files 604 and GUI files 606.

The transfer function metadata 602 may be stored in XML format and be contained in the TranferFunctionName.cmx file. The metadata 602 may hold the file list for the transfer function as well as attributes describing the transfer function. These attributes may include information on whether the transfer function can have multiple inputs, what type of inputs are allowed, should it be evaluated after other transfer functions, etc.

Table 1 presents an exemplary list of transfer function attributes.

TABLE 1

| Attribute Name | Description |
| --- | --- |
| INTRINSIC | Specifies INTRINSIC or Data Driven |
|  | true |
|  | false |
| MULTIPLEINPUT | Specifies Multiple or Single inputs |
|  | true |
|  | false |
| INPUTSTYPE | Specifies allowed input type |
|  | CONTINUOUS |
|  | DISCREETE |
|  | BOTH |
| NAME | Name e.g. "PID", "Unit_Delay" |
| RETURN_TYPE | Indicates allowed input type |
|  | DISCRETE |
|  | CONTINUOUS |
| XGUI_PATH="NewTF.htm" | XGUI Path |
| DETAIL_GUI_PATH="detail.htm" | Help Path |

The transfer function fragments 604 may provide substitutions into the application design project. They may allow a function call to be made each time through the main loop of the project. They may also allow the initialization of data structures that parameterize the transfer function.

The GUI 606 may include the html page seen by the user and the JavaScript logic (referred to as a processing script) that creates the variable and expression metadata in the project, as well as scalable vector graphics.

As discussed above, in one embodiment, adding a data driven transfer function involves adding files to the directory structure associated with the application development tool 100. An exemplary directory structure may be as follows:

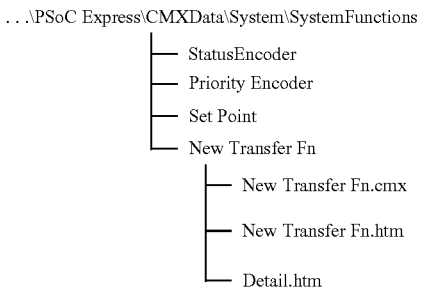

The new data driven transfer function may be placed in parallel to the existing transfer functions. Each new data driven transfer function sub-directory includes a NewTransferFunction.cmx file containing custom metadata. The name attribute in the CMX file determines whether the transfer function is data driven or intrinsic. If a name is not found in the list of intrinsic functions the transfer function is data driven.

Figure 7:
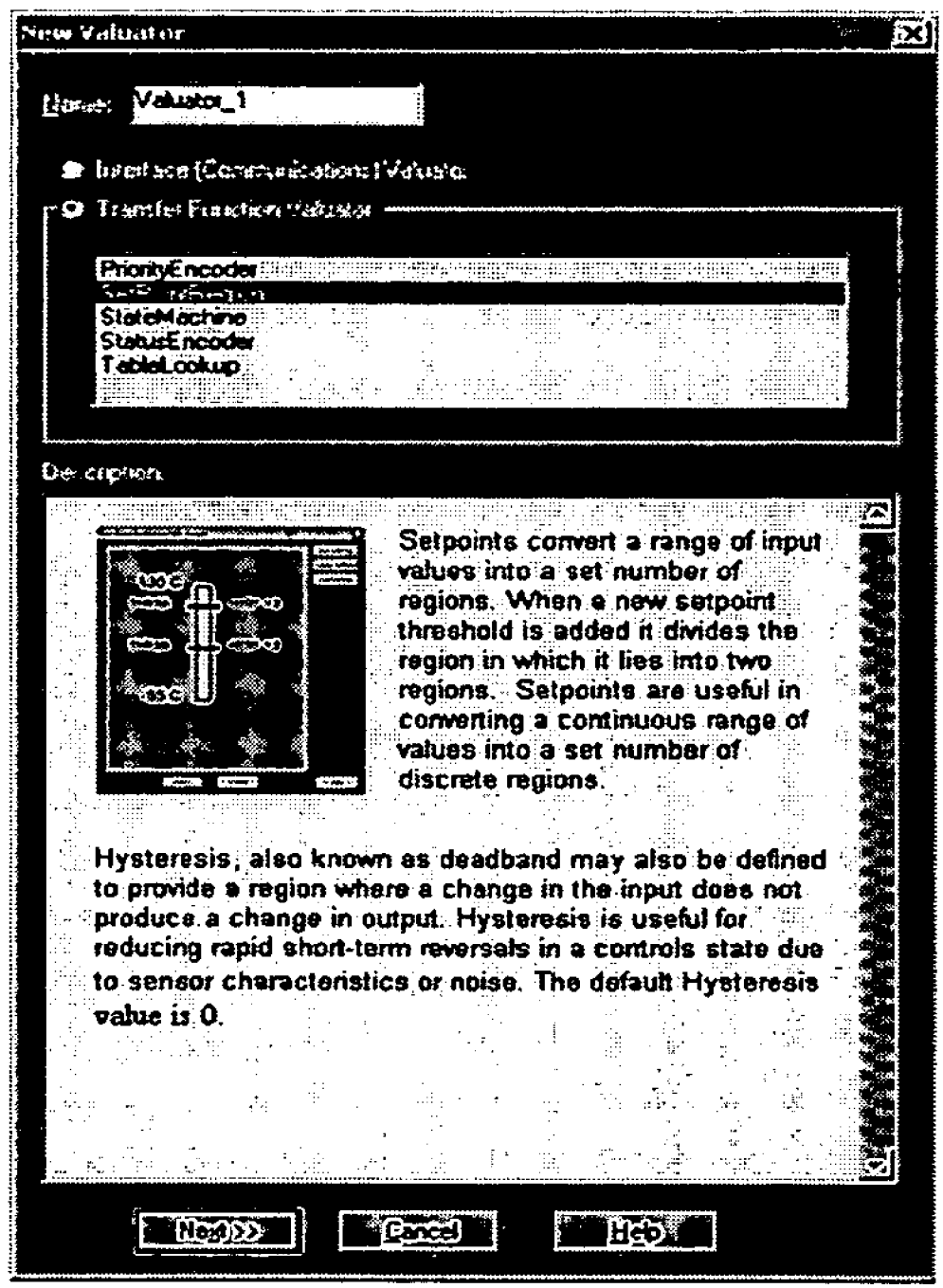
FIGS. 7 and 8 illustrate exemplary UI provided by the transfer function module.

When the user specifies a transfer function of a new type, a New Valuator dialog box may be presented to the user, as shown in FIG. 7.

Figure 8:
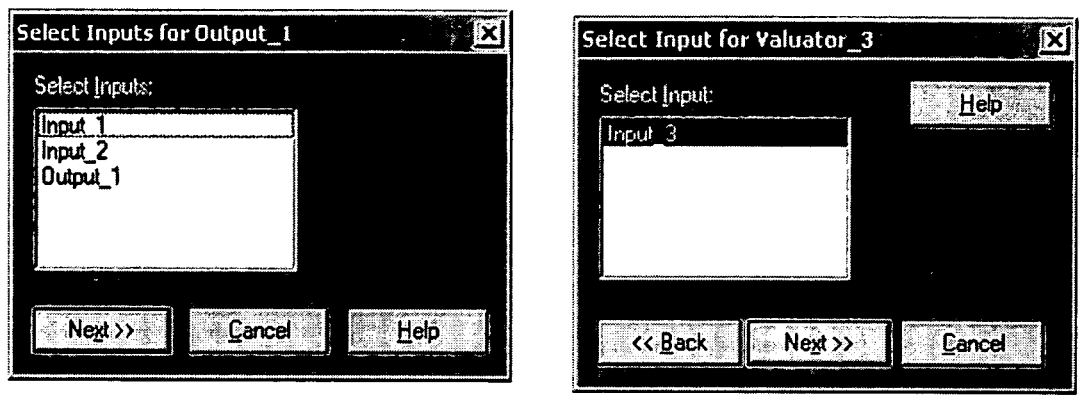

When the user selects to add a data driven transfer function, an Input Selection dialog is presented, if specified by the transfer function metadata, as shown in FIG. 8.

Figure 9:
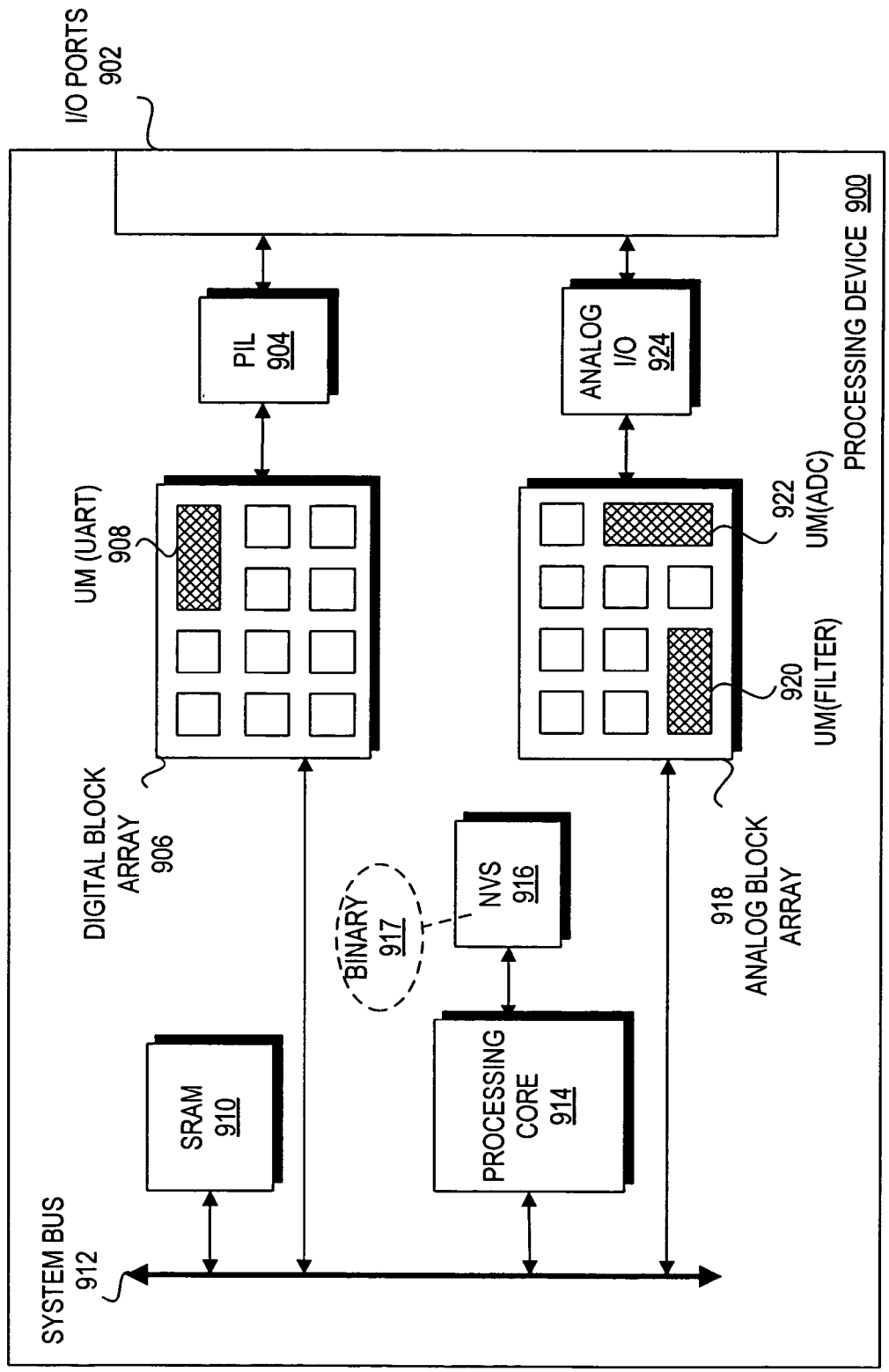
FIG. 9 is a block diagram of one embodiment of a processing device.

Turning to FIG. 9, an embodiment of a processing device 900 is shown. Processing device 900 includes a microcontroller. Processing device 900 includes Input/Output (I/O) ports 902. In one embodiment, I/O ports 902 are programmable. I/O ports 902 are coupled to a Programmable Interconnect and Logic (PIL) 904 which is coupled to a digital block array 906. In FIG. 9, digital block array 906 includes a UM 908 that has been configured as a Universal Asynchronous Receive/Transmitter (UART). Digital block array 906 is coupled to a system bus 912.

A Static Random Access Memory (SRAM) 910 and a processing core 914 are also coupled to system bus 912. Processing core 914 is coupled to NVS 916 which has stored a binary 917. In one embodiment, binary 917 includes instructions generated as described herein. In another embodiment, binary 917 may include instructions executable by processing core 914 as well as instructions for configuring block arrays 916 and 918.

Analog block array 918 is coupled to system bus 912. In the embodiment of FIG. 9, analog block array 918 includes a UM 920 configured as a filter and a UM 922 configured as an ADC. Analog block array 918 is also coupled to an analog I/O unit 924 which is coupled to I/O ports 902. Processing device 900 may also include other components, not shown for clarity, including a clock generator, an interrupt controller, an I2C, or the like.

Figure 10:
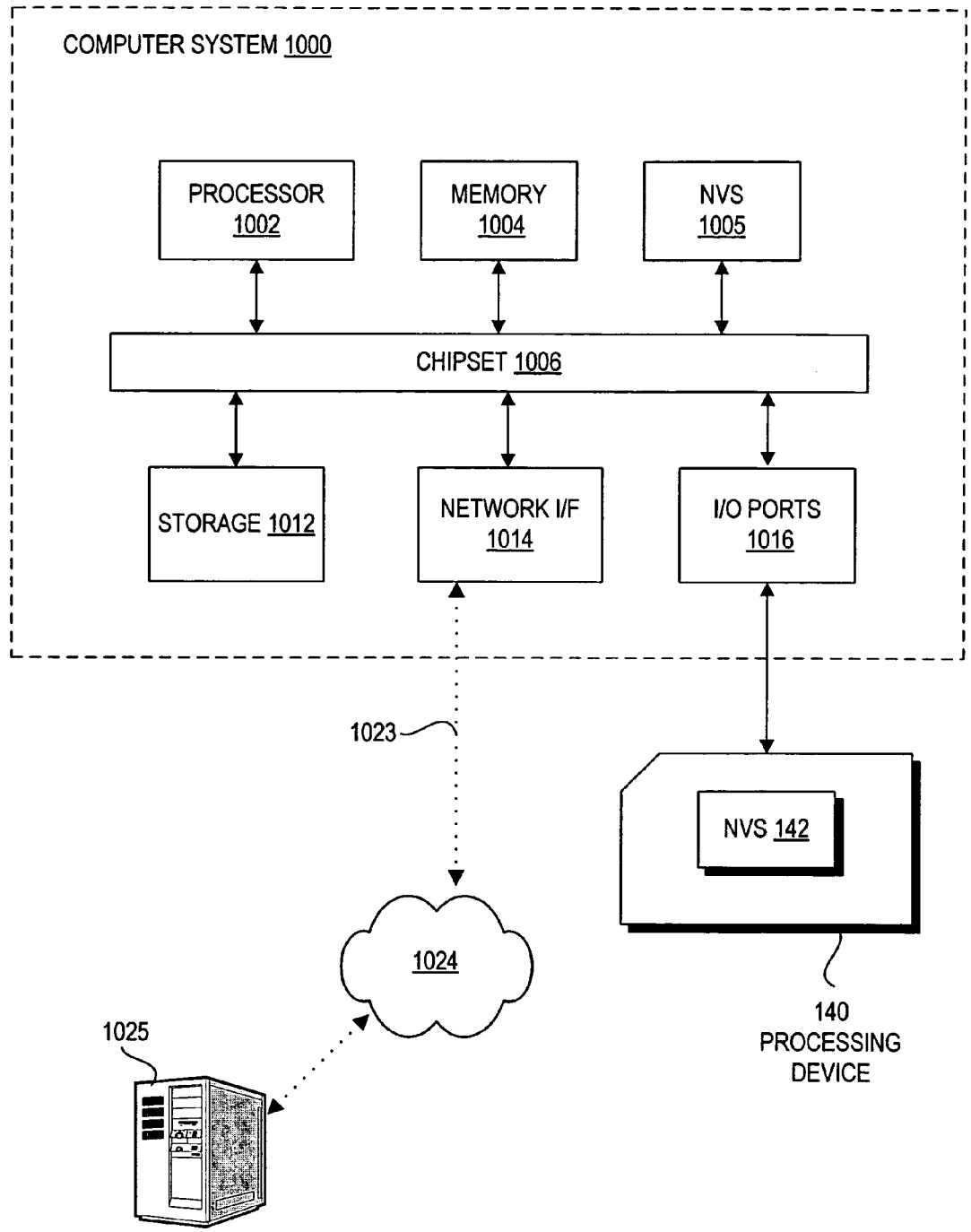
FIG. 10 is a block diagram of one embodiment of a computer system.

FIG. 10 illustrates an exemplary computer system 1000 on which embodiments of the present invention may be implemented. Computer system 1000 includes a processor 1002 and a memory 1004 coupled to a chipset 1006. Storage 1012, Non-Volatile Storage (NVS) 1005, network interface (I/F) 1014, and Input/Output (I/O) ports 1018 may also be coupled to chipset 1006. Embodiments of computer system 1000 include, but are not limited to, a desktop computer, a notebook computer, a server, a personal digital assistant, a network workstation, or the like. In one embodiment, processor 1002 executes instructions stored in memory 1004.

Memory 1004 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like.

Chipset 1006 may include a memory controller and an input/output controller. Chipset 1006 may also include system clock support, power management support, audio support, graphics support, or the like. In one embodiment, chipset 1006 is coupled to a board that includes sockets for processor 1002 and memory 1004.

Components of computer system 1000 may be connected by various interconnects. Such interconnects may include a Peripheral Component Interconnect (PCI), a System Management bus (SMBUS), a Low Pin Count (LPC) bus, a Serial Peripheral Interface (SPI) bus, an Accelerated Graphics Port (AGP) interface, or the like.

I/O ports 1016 may include ports for a keyboard, a mouse, a display, a printer, a scanner, or the like. Embodiments of I/O ports 1016 include a Universal Serial Bus port, a Firewire port, a Video Graphics Array (VGA) port, a Personal System/2 (PS/2) port, or the like.

Processing device 140 may be coupled to computer system 1000 via I/O ports 1016. Computer system 1000 may have stored computer-readable instructions, in accordance with embodiments described herein, to allow a user to design the application 122 using UIs described herein and automatically generate processing device code for processing device 140 using computer system 1000. This code may be compiled into a binary and loaded into NVS 142.

Computer system 1000 may interface to external systems through network interface 1014. Network interface 1014 may include, but is not limited to, a modem, a Network Interface Card (NIC), or other interfaces for coupling a computer system to other computer systems. A carrier wave signal 1023 may be received/transmitted by network interface 1014. In the embodiment illustrated in FIG. 10, carrier wave signal 1023 is used to interface computer system 1000 with a network 1024, such as a Local Area Network (LAN), a Wide Area Network (WAN), the Internet, or any combination thereof. In one embodiment, network 1024 is further coupled to a computer system 1025 such that computer system 1000 and computer system 1025 may communicate over network 1024.

Computer system 1000 also includes non-volatile storage 1005 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 1012 includes, but is not limited to, a magnetic disk drive, a magnetic tape drive, an optical disk drive, or the like. It is appreciated that instructions executable by processor 1002 may reside in storage 1012, memory 1004, non-volatile storage 1005, or may be transmitted or received via network interface 1014.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., Read-Only Memory (ROM), Random Access Memory (RAM), magnetic disk storage media, optical storage media, a flash memory device, etc.). In addition, a machine-readable medium may include propagated signals such as electrical, optical, acoustical or other forms of propagated signals (e.g., carrier waves, infrared signals, digital signals, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer-implemented method for an application development tool, comprising:
    determining that a function specified by a user for a design of an application is of a new type;
    presenting a user interface (UI) associated with the specified function;
    creating custom metadata based on input provided by the user via the UI for the specified function; and
    converting the custom metadata into expression metadata having a format understandable by a code generator.

2. The method of claim 1 wherein the application is an embedded application for a processing device.

3. The method of claim 1 wherein the custom metadata is converted using a processing script.

4. The method of claim 3 wherein converting the custom metadata into the expression metadata comprises:
    creating variables required by the function; and
    creating logic expressions specific to the function.

5. The system of claim 1 wherein determining that the function specified by the user is of the new type comprises:
    determining that a name of the function is not in a list of intrinsic functions.

6. The method of claim 1 wherein the new type was not supported by the application development tool when the application development tool was compiled.

7. The method of claim 6 wherein files containing data describing the new function type were added to a directory structure associated with the application development tool after the application development tool was compiled.

8. The method of claim 7 wherein the files containing data describing the new function type comprise a metadata file containing function metadata used for creating the custom metadata, and at least one UI file used for presentation of the function UI.

9. The method of claim 8 wherein the function metadata includes a set of characteristics pertaining to the new function type, the set of characteristics comprising at least one of a new type indicator, a multiple input indicator, an input type characteristic, a name of the new function type, and a path to the UI file.

10. The method of claim 8 wherein the files containing data describing the new function type further comprise at least one fragments file providing substitutions into a design project for the application.

11. The method of claim 10 wherein the metadata file, the fragment file and the UI file are located in an installation directory associated with the application development tool.

12. An article of manufacture comprising:
a non-transitory machine-readable medium including a plurality of instructions which when executed perform a method for an application development tool, the method comprising:
determining that a function specified by a user for a design of an application is of a new type;
presenting a user interface (UI) associated with the specified function;
creating custom metadata based on input provided by the user via the UI for the specified function; and
converting the custom metadata into expression metadata having a format understandable by a code generator.

13. The article of manufacture of claim 12 wherein converting the custom metadata into the expression metadata comprises:
creating variables required by the function; and
creating logic expressions specific to the function.

14. The article of manufacture of claim 12 wherein the new type was not supported by the application development tool when the application development tool was compiled.

15. The article of manufacture of claim 14 wherein files containing data describing the new function type were added to a directory structure associated with the application development tool after the application development tool was compiled.

16. An apparatus for an application development tool, the apparatus comprising:
a new function type identifier to determine that a function specified by a user for a design of an application is of a new type;
a function user interface (UI) module to present a UI associated with the specified function, and to create, using a processing device, custom metadata based on input provided by the user via the UI for the specified function; and
a script to convert the custom metadata into expression metadata having a format understandable by a code generator.

17. The apparatus of claim 16 wherein the script is to convert the custom metadata into the expression metadata by
creating variables required by the function, and
creating logic expressions specific to the function.

18. The apparatus of claim 16 wherein the new type was not supported by the application development tool when the application development tool was compiled.

19. The apparatus of claim 18 wherein files containing data describing the new function type were added to a directory structure associated with the application development tool after the application development tool was compiled.

20. The apparatus of claim 19 wherein the files containing data describing the new function type further comprise at least one fragments file providing substitutions into a design project for the application.

* * * * *